(12) United States Patent
Priyanto et al.

(10) Patent No.: US 12,739,872 B2
(45) Date of Patent: Sep. 15, 2026

(54) LOW-LATENCY RANDOM ACCESS FOR WIRELESS NETWORKS

(71) Applicant: Sony Group Corporation, Tokyo (JP)

(72) Inventors: Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/475,477

(22) PCT Filed: Jan. 2, 2018

(86) PCT No.: PCT/EP2018/050052
§ 371 (c)(1),
(2) Date: Jul. 2, 2019

(87) PCT Pub. No.: WO2018/127487
PCT Pub. Date: Jul. 12, 2018

(65) Prior Publication Data
US 2019/0342912 A1 Nov. 7, 2019

(30) Foreign Application Priority Data
Jan. 5, 2017 (EP) .................................... 17150392

(51) Int. Cl.
*H04W 74/00* (2009.01)
*H04W 72/044* (2023.01)
(Continued)

(52) U.S. Cl.
CPC ....... *H04W 74/006* (2013.01); *H04W 72/046* (2013.01); *H04W 72/23* (2023.01);
(Continued)

(58) Field of Classification Search
None
See application file for complete search history.

(56) References Cited

U.S. PATENT DOCUMENTS 9,775,134 B2 * 9/2017 Papasakellariou ........ H04L 5/14
2008/0279257 A1 * 11/2008 Vujcic ............... H04W 74/0866 375/E1.034
(Continued)

FOREIGN PATENT DOCUMENTS

CN 103999528 A 8/2014
WO WO-2015122737 A1 * 8/2015 ........... H04W 72/23
(Continued)

OTHER PUBLICATIONS

International Search Report and Written Opinion from corresponding International Patent Application No. PCT/EP2018/050052 mailed May 14, 2018; 19 pages.
(Continued)

*Primary Examiner* — Wutchung Chu
*Assistant Examiner* — Berhanu D Belete
(74) *Attorney, Agent, or Firm* — Tucker Ellis LLP

(57) ABSTRACT

At least one information block is received from a base station of a network, the at least one information block indicating one or more first resources (511) and one or more second resources (512) for a random-access procedure, the second resources (512) being offset from the first resources (511) by a time gap (550). A preamble (2011) of the random-access procedure is transmitted to the base station using the one or more first resources (511) and data (2012) is transmitted to the base station using the one or more second resources (512).

17 Claims, 14 Drawing Sheets

(51) Int. Cl.
*H04W 72/23* (2023.01)
*H04W 72/566* (2023.01)
*H04W 74/0833* (2024.01)
*H04W 74/0836* (2024.01)

(52) U.S. Cl.
CPC ..... *H04W 72/569* (2023.01); *H04W 74/0833* (2013.01); *H04W 74/0836* (2024.01)

(56) References Cited

U.S. PATENT DOCUMENTS

2009/0280747 A1* 11/2009 Sudarshan .......... H04L 25/0228 455/63.1
2010/0278064 A1* 11/2010 Jeong .................. H04W 74/002 370/252
2013/0083753 A1 4/2013 Lee et al.
2013/0242735 A1* 9/2013 Koc ...................... H04L 1/1607 370/232
2014/0198742 A1* 7/2014 Baldemair ........ H04W 74/0833 370/329
2014/0293968 A1* 10/2014 Ebrahimi Tazeh Mahalleh .......... H04W 56/001 370/336
2015/0016312 A1* 1/2015 Li ............................ H04L 5/14 370/280
2015/0181546 A1* 6/2015 Freda ................ H04W 56/0015 370/336
2016/0007377 A1* 1/2016 Frenne .................. H04W 72/02 370/329
2016/0157267 A1 6/2016 Frenne
2016/0192433 A1* 6/2016 Deenoo ................. H04W 24/08 370/329
2016/0269956 A1* 9/2016 Sawhney .............. H04W 36/08
2016/0295609 A1* 10/2016 Vajapeyam ........... H04W 72/23
2016/0309518 A1* 10/2016 Patel ................. H04W 74/0836
2016/0366704 A1* 12/2016 Lee ....................... H04W 72/21
2017/0013610 A1* 1/2017 Lee ....................... H04W 72/21
2017/0019930 A1* 1/2017 Lee ....................... H04W 72/21
2017/0064579 A1* 3/2017 Park ........................ H04W 8/04
2017/0188352 A1* 6/2017 Lee ....................... H04L 1/1812
2017/0201974 A1* 7/2017 Sohn ..................... H04W 72/21
2017/0207843 A1* 7/2017 Jung .................... H04B 7/0408
2017/0331577 A1* 11/2017 Parkvall ............... H04B 7/0452
2017/0331670 A1* 11/2017 Parkvall .............. H04L 41/0233
2018/0020503 A1* 1/2018 Deenoo ............... H04W 72/046
2018/0070237 A1* 3/2018 Cho .................... H04L 63/0428
2018/0084560 A1* 3/2018 Cho ...................... H04W 72/20
2018/0123650 A1* 5/2018 Yu ........................ H01Q 25/002
2018/0139787 A1* 5/2018 Islam ................... H04B 7/0617
2018/0184447 A1* 6/2018 Wang .................... H04L 1/0009
2018/0213418 A1* 7/2018 Dimou .............. H04W 74/0833
2018/0249479 A1* 8/2018 Cho .................... H04L 63/0428
2018/0270873 A1* 9/2018 Cho ........................ H04W 8/02
2018/0302915 A1* 10/2018 Einhaus ................ H04W 16/14
2018/0359790 A1* 12/2018 Ingale .................. H04W 72/51
2019/0104549 A1* 4/2019 Deng .................. H04B 7/0617
2019/0174554 A1* 6/2019 Deenoo ................ H04B 7/0408
2019/0182785 A1* 6/2019 da Silva ................ H04W 16/28
2019/0261432 A1* 8/2019 Kela .................... H04B 7/0408
2019/0289592 A1* 9/2019 Lee ........................... H04L 1/18
2019/0320467 A1* 10/2019 Freda .................... H04L 5/0055
2019/0342912 A1* 11/2019 Priyanto ............. H04W 72/046
2020/0037297 A1* 1/2020 Pan .................... H04B 7/06966
2020/0053800 A1* 2/2020 Deng .................. H04B 7/0617
2020/0084751 A1* 3/2020 Papasakellariou .... H04L 5/0094
2020/0187246 A1* 6/2020 Amuru ................... H04B 7/088
2020/0236715 A1* 7/2020 Akkarakaran ........ H04W 40/38
2020/0252962 A1* 8/2020 Vajapeyam ............... H04L 5/14
2021/0266043 A1* 8/2021 Xiong ................... H04W 48/12
2023/0300842 A1* 9/2023 Agiwal ................. H04W 72/21 370/329

FOREIGN PATENT DOCUMENTS

WO 2015137632 A1 9/2015
WO WO-2016153130 A1 9/2016
WO 2016168024 A1 10/2016
WO 2017218762 A1 12/2017

OTHER PUBLICATIONS

Fujitsu, "Idle mode UE operations in NR with beamforming", Nov. 13, 2016, 3GPP, vol. RAN WG2, No. Reno, [retrieved online] <http://www.3gpp.org/ftp/Meetings_3GPP_SYNC/RAN2/Docs/>.
Sony, "Considerations on Multiple Beams RACH Procedure", Nov. 13, 2016, 3GPP, vol. RAN WG1, No. Reno, [retrieved online] <http://www.3gpp.org/ftp/Meetings_3GPP_SYNC/RAN1/Docs/>.
Office Action from corresponding European Application No. 18 700 013.8 mailed on Apr. 15, 2021, 9 pages.

* cited by examiner

100
DL
BS
UE
UL
101
102
111

LOW-LATENCY RANDOM ACCESS FOR WIRELESS NETWORKS

TECHNICAL FIELD

Various examples of the invention generally relate to a random-access procedure of a device connecting to a network. Various examples of the invention specifically relate to allocation of resources of the random-access procedure. Furthermore, various examples of the invention specifically relate to beam configurations in the context of the random-access procedure.

BACKGROUND

A device/terminal (UE) configured to wirelessly communicate with a base station (BS) of a network may be in a disconnected state or idle state. Then, for connecting to the network, the UE may transition into a connected state by performing a random-access procedure. Triggers to perform the random-access (RACH) procedure may include uplink (UL) data scheduled for transmission and/or receipt of a downlink paging indicative of downlink data scheduled for transmission and/or downlink (DL) data schedule for transmission.

For the RACH procedure, the UE may periodically listen to information blocks broadcasted by one or more BSs of the network. For example, the broadcasted information blocks may include such information as a cell identity of the broadcasting BS. Based on the broadcasted information, the UE may then transmit a randomly selected preamble to the BS. In response to transmitting the preamble, the UE may receive a RACH response including a grant for UL resources on which the UE can send a higher-layer connection request. For example, in the context of the Third Generation Partnership Project (3GPP) Long Term Evolution (LTE) protocol, the connection request may relate to the Radio Resource Control (RRC) layer of the transmission protocol stack, i.e., Layer 3 according to the Open System Interface (OSI) model. Details of the RACH procedure according to 3GPP LTE are described in 3GPP Technical Specification (TS) 36.211, 36.231, 36.321, and 36.331.

The 3GPP LTE protocol employs a RACH procedure including 4 messages exchanged between the UE and the BS (4-step RACH procedure). However, other RACH procedures are known which implement fewer messages, e.g., two messages exchanged between UE and the BS. See, e.g., 3GPP TSG-RANI Meeting #86bis R1-1610992, "LS on NR RACH Procedure" (2-step RACH procedure).

Reference implementations of RACH procedures face certain restrictions and drawbacks. For example, it is possible that the latency until transmission of UL data and DL data which triggers the RACH procedure is significant. On the other hand, shortened RACH procedures such as the 2-step RACH procedure may face reduced reliability due to increased interference.

SUMMARY

Therefore, a need exists for advanced RACH procedures. In particular, a need exists for such techniques which overcome or mitigate at least some of the above-identified restrictions and drawbacks.

This need is met by the features of the independent claims. The features of the dependent claims define embodiments.

A device includes control circuitry configured to receive at least one information block. The at least one information block is received from a network node of a network. The at least one information block indicates one or more first resources and one or more second resources for a RACH procedure. The one or more second resources are offset from the one or more first resources by a time gap. The control circuitry is further configured to transmit a preamble of the RACH procedure to the network node using the one or more first resources. The control circuitry is further configured to transmit data to the network node using the one or more second resources.

A method includes receiving at least one information block from a network node of a network. The at least one information block indicates one or more first resources and one or more second resources of a RACH procedure. The one or more second resources are offset from the one or more first resources by a time gap. The method further includes transmitting a preamble of the RACH procedure to the network node using the one or more first resources and transmitting data to the network node using the one or more second resources.

A computer program product includes program code executable by at least one processor. Executing the program code causes the at least one processor to perform a method. The method includes receiving at least one information block from a network node of a network. The at least one information block indicates one or more first resources and one or more second resources of a RACH procedure. The one or more second resources are offset from the one or more first resources by a time gap. The method further includes transmitting a preamble of the RACH procedure to the network node using the one or more first resources and transmitting data to the network node using the one or more second resources.

A computer program includes program code executable by at least one processor. Executing the program code causes the at least one processor to perform a method. The method includes receiving at least one information block from a network node of a network. The at least one information block indicates one or more first resources and one or more second resources of a RACH procedure. The one or more second resources are offset from the one or more first resources by a time gap. The method further includes transmitting a preamble of the RACH procedure to the network node using the one or more first resources and transmitting data to the network node using the one or more second resources.

A device includes control circuitry configured to receive at least one information block. The at least one information block is received from a network node of a network. The at least one information block indicates resources for a RACH procedure. The control circuitry is further configured to transmit a preamble of the RACH procedure to the network node using the resources and to transmit data indicative of a suggested DL transmit beam configuration of a DL message of the RACH procedure to the network node using the resources.

A method includes receiving at least one information block. The at least one information block is received from a network node of a network. The at least one information block indicates one or more resources for a RACH procedure. The method further includes transmitting a preamble of the RACH procedure to the network node using the one or more resources. The method further includes transmitting data indicative of a suggested DL transmit beam configuration of a DL message of the RACH procedure to the network node using the one or more resources.

A computer program product includes program code executable by at least one processor. Executing the program code causes the at least one processor to perform a method. The method includes receiving at least one information block. The at least one information block is received from a network node of a network. The at least one information block indicates one or more resources for a RACH procedure. The method further includes transmitting a preamble of the RACH procedure to the network node using the one or more resources. The method further includes transmitting data indicative of a suggested DL transmit beam configuration of a DL message of the RACH procedure to the network node using the one or more resources.

A computer program includes program code executable by at least one processor. Executing the program code causes the at least one processor to perform a method. The method includes receiving at least one information block. The at least one information block is received from a network node of a network. The at least one information block indicates one or more resources for a RACH procedure. The method further includes transmitting a preamble of the RACH procedure to the network node using the one or more resources. The method further includes transmitting data indicative of a suggested DL transmit beam configuration of a DL message of the RACH procedure to the network node using the one or more resources.

A network node includes control circuitry configured to transmit at least one information block. The at least one information block indicates one or more first resources and one or more second resources for a RACH procedure. The one or more second resources are offset from the one or more first resources by a time gap. The control circuitry is further configured to receive a preamble of the RACH procedure on the one or more first resources. The control circuitry is further configured to receive data using the one or more second resources.

A method includes transmitting at least one information block. The at least one information block indicates one or more first resources and one or more second resources for a RACH procedure. The one or more second resources are offset from the one or more first resources by a time gap. The method further includes receiving a preamble of the RACH procedure on the one or more first resources and receiving data using the one or more second resources.

A computer program product includes program code executable by at least one processor. Executing the program code causes the at least one processor to perform a method. The method includes transmitting at least one information block. The at least one information block indicates one or more first resources and one or more second resources for a RACH procedure. The one or more second resources are offset from the one or more first resources by a time gap. The method further includes receiving a preamble of the RACH procedure on the one or more first resources and receiving data using the one or more second resources.

A computer program includes program code executable by at least one processor. Executing the program code causes the at least one processor to perform a method. The method includes transmitting at least one information block. The at least one information block indicates one or more first resources and one or more second resources for a RACH procedure. The one or more second resources are offset from the one or more first resources by a time gap. The method further includes receiving a preamble of the RACH procedure on the one or more first resources and receiving data using the one or more second resources.

A network node includes control circuitry. The control circuitry is configured to transmit at least one information block. The at least one information block indicates one or more resources for a RACH procedure. The control circuitry is further configured to receive a preamble of the RACH procedure using the one or more resources. The control circuitry is further configured to receive data indicative of a suggested DL transmit beam configuration of a DL message of the RACH procedure using the one or more resources. The control circuitry is further configured to determine a DL transmit beam configuration of the DL message depending on the suggested DL transmit beam configuration. The control circuitry is further configured to transmit the DL message using the determined DL transmit beam configuration.

A method includes transmitting at least one information block. The at least one information block indicates one or more resources for a RACH procedure. The method further includes receiving a preamble of the RACH procedure using the one or more resources. The method further includes receiving data indicative of a suggested DL transmit beam configuration of a DL message of the RACH procedure using the one or more resources. The method further includes determining a DL transmit beam configuration of the DL message depending on the suggested DL transmit beam configuration. The method further includes transmitting the DL message using the determined DL transmit beam configuration.

A computer program product includes program code executable by at least one processor. Executing the program code causes the at least one processor to perform a method. The method includes transmitting at least one information block. The at least one information block indicates one or more resources for a RACH procedure. The method further includes receiving a preamble of the RACH procedure using the one or more resources. The method further includes receiving data indicative of a suggested DL transmit beam configuration of a DL message of the RACH procedure using the one or more resources. The method further includes determining a DL transmit beam configuration of the DL message depending on the suggested DL transmit beam configuration. The method further includes transmitting the DL message using the determined DL transmit beam configuration.

A computer program includes program code executable by at least one processor. Executing the program code causes the at least one processor to perform a method. The method includes transmitting at least one information block. The at least one information block indicates one or more resources for a RACH procedure. The method further includes receiving a preamble of the RACH procedure using the one or more resources. The method further includes receiving data indicative of a suggested DL transmit beam configuration of a DL message of the RACH procedure using the one or more resources.

The method further includes determining a DL transmit beam configuration of the DL message depending on the suggested DL transmit beam configuration. The method further includes transmitting the DL message using the determined DL transmit beam configuration.

A device includes control circuitry. The control circuitry is configured to select between the first RACH procedure and the second RACH procedure. The first RACH procedure includes a first number of messages. The second RACH procedure includes a second number of messages. The second number of messages is different from the first number of messages. Said selecting between the first RACH procedure and the second RACH procedure depends on elements selected from the group comprising: idle state operation of a device; availability of a-priori identification of the device; mobility level of the device; queued UL data; and a latency requirement of the queued UL data.

A method includes selecting between the first RACH procedure and the second RACH procedure. The first RACH procedure includes a first number of messages. The second RACH procedure includes a second number of messages. The second number of messages is different from the first number of messages. Said selecting between the first RACH procedure and the second RACH procedure depends on elements selected from the group comprising: idle state operation of a device; availability of a-priori identification of the device; mobility level of the device; queued UL data; and a latency requirement of the queued UL data.

A computer program product includes program code executable by at least one processor. Executing the program code causes the at least one processor to perform a method. The method includes selecting between the first RACH procedure and the second RACH procedure. The first RACH procedure includes a first number of messages. The second RACH procedure includes a second number of messages. The second number of messages is different from the first number of messages. Said selecting between the first RACH procedure and the second RACH procedure depends on elements selected from the group comprising: idle state operation of a device; availability of a-priori identification of the device; mobility level of the device; queued UL data; and a latency requirement of the queued UL data.

A computer program product includes program code executable by at least one processor. Executing the program code causes the at least one processor to perform a method. The method includes selecting between the first RACH procedure and the second RACH procedure. The first RACH procedure includes a first number of messages. The second RACH procedure includes a second number of messages. The second number of messages is different from the first number of messages. Said selecting between the first RACH procedure and the second RACH procedure depends on elements selected from the group comprising: idle state operation of a device; availability of a-priori identification of the device; mobility level of the device; queued UL data; and a latency requirement of the queued UL data.

A system comprises a network node comprising first control circuitry and a device comprising second control circuitry. The first control circuitry is configured to transmit at least one information block. The at least one information block indicates one or more first resources and one or more second resources for a random-access procedure. The one or more second resources are offset from the one or more first resources by a time gap. The second control circuitry is configured to receive the at least one information block. The second control circuitry is configured to transmit a preamble of the random-access procedure using the one or more first resources. The first control circuitry is configured to receive the preamble. The second control circuitry is configured to transmit data using the one or more second resources. The first control circuitry is configured to receive the data.

A system comprises a network node comprising first control circuitry and a device comprising second control circuitry. The first control circuitry is configured to transmit at least one information block. The at least one information block indicates one or more resources for a random-access procedure. The second control circuitry is configured to receive the at least one information block. The second control circuitry is configured to transmit a preamble of the random-access procedure using the one or more resources. The first control circuitry is configured to receive the preamble. The second control circuitry is configured to transmit data using the one or more resources. The first control circuitry is configured to receive the data. The data is indicative of a suggested downlink transmit beam configuration of a downlink message of the random-access procedure using the one or more resources. Optionally, the first control circuitry may be configured to determine a downlink transmit beam configuration of the downlink message depending on the suggested downlink transmit beam configuration and to transmit the downlink message using the determined downlink transmit beam configuration.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figures 1, 2:
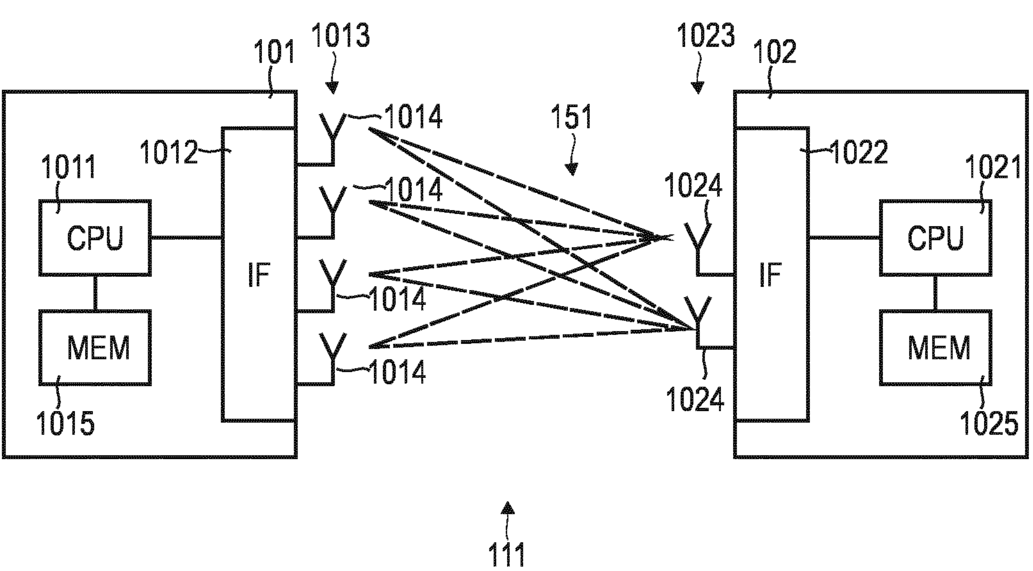
FIG. 1 schematically illustrates a network comprising a wireless link between a BS of the network and the UE of the network according to various examples.
FIG. 2 schematically illustrates the BS and the UE of FIG. 1 in greater detail according to various examples and further illustrates multiple propagation channels associated with different beam configurations of antenna arrays of the BS and the UE according to between the BS and the UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques related to a RACH procedure of a UE connecting to a network are described. For example, the network may be a cellular network comprising multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques described herein may be implemented with respect to a 2-step RACH procedure or with respect to a 4-step RACH procedure or with respect to a RACH procedure including a different number of messages exchanged between the UE and the network.

According to various examples, the RACH procedures described herein may include one or more messages transmitted and/or received using a certain beam configuration. This may define different propagation channels. For this, the UE and/or the BS may be employed with an antenna array including a plurality of antennas.

According to various examples, it is possible that the initial UL message transmitted by the UE to the BS as part of the RACH procedure already includes data. According to various examples, it is possible that said data is transmitted along with a preamble of the RACH procedure. Typically, the preamble is transmitted as the initial message of the RACH procedure. Generally, according to various examples the data may be transmitted in resources allocated for the RACH procedure. As such, the data may be transmitted in resources which are advertised by an information block broadcasted by the BS. While—on the one hand side—this bears the risk of interference due to synchronous access to the medium by two or more UEs—on the other hand side—this facilitates transmission of the data with comparably low latency.

For example, the data may correspond to limited size of payload data. Thereby, applications employing the payload data may benefit from a reduce latency, because a Layer 3 data connection—such as an end-to-end bearer or RRC bearer in the 3GPP LTE framework etc.—are not required to be established before the UL payload data can be transmitted. Alternatively or additionally, the data may correspond to control data, e.g., Layer 2 or Layer 3 control data, i.e., control data of a layer different from the physical layer.

For example, the data may be indicative of the suggested DL transmit beam configuration of the DL message of the RACH procedure which is triggered by the first UL message. Thereby, selection of the appropriate beam configuration by the BS is facilitated which reduces latency and avoids transmission failure. The complexity of the processing task of determining the DL transmit beam configuration can be reduced by providing the suggested DL transmit beam configuration. Thereby, the BS can find the appropriate DL transmit beam configuration faster and more accurate. This helps to implement the DL transmission of the DL message such that the signal-to-noise ratio is increased at the UE.

In various examples, the data which is transmitted in the resources allocated for the RACH procedure can be transmitted in resources which are offset in time domain from the resources of the preamble. In particular, transmission of the data can be postponed by a certain time gap from transmission of the preamble. This facilitates determination of the appropriate UL receive beam configuration of the BS employed for receiving the data. In particular, it would be possible that the UL receive beam configuration is determined by the BS based on reception of the preamble and during the time gap. Here, it would be possible to employ a beam sweeping operation by the BS during the associated resources that are used by the UE to transmit multiple repetitions of the preamble. By providing the time gap, a certain processing delay of the BS for determining the UL receive beam configuration can be accounted for, e.g., by determining the UL receive beam configuration of the beam sweeping operation which provided best reception. This increases the likelihood of successfully receiving the data.

While, conventionally, RACH procedures generally serve the purpose of establishing a higher-layer connection—such as an Layer 3 RRC bearer in the 3GPP LTE framework—according to various examples it is not mandatory that such a higher-layer data connection is established in response to the RACH procedure. In particular, it may be possible that the RACH procedure is triggered by UL data scheduled for transmission at the UE. Sometimes, it may be possible to fully accommodate this UL data in the resources allocated for the RACH procedure such that no additional UL grant for the transmission of the UL data is required. Then, it may also be expendable to set up the higher-layer connection. For example, whether or not a higher-layer data connection is required may be indicated by a buffer status report (BSR) transmitted by the UE during the RACH procedure.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. A wireless link 111 is established between the BS 101 and the UE 102. The wireless link 111 includes a DL link from the BS 101 to the terminal 102; and further includes an UL link from the terminal 102 to the BS 101. Time-division duplexing (TDD), frequency-division duplexing (FDD), and/or code-division duplexing (CDD) may be employed for mitigating interference between UL and DL. Alternatively or additionally, space-division duplex (SDD) may be employed. Likewise, TDD, FDD, SDD, and/or CDD may be employed for mitigating interference between multiple UEs communicating on the wireless link 111 (not shown in FIG. 1).

The UE 102 may be one of the following: a smartphone; a cellular phone; a table; a notebook; a computer; a smart TV; an MTC device; an eMTC device; an IoT device; an NB-loT device; a sensor; an actuator; etc.

FIG. 2 schematically illustrates the BS 101 and the UE 102 in greater detail. The BS 101 includes a processor 1011 and an interface 1012. The interface 1012 is coupled with an antenna array 1013 including a plurality of antennas 1014. In some examples, the antenna array 1013 may include at least 30 antennas 1014, optionally at least 110 antennas, further optionally at least 200 antennas. Sometimes, a scenario implementing a large number of antennas 1014 is referred to as full dimension multiple-input multiple-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. As such, the antennas 1014 may form an antenna port for providing an output signal to the radiating LC-oscillators.

The BS 101 further includes a memory 1015, e.g., a non-volatile memory. The memory may store program code that can be executed by the processor 1011. Executing the program code may cause the processor 1011 to perform techniques with respect to RACH procedures as described herein.

The UE 102 includes a processor 1021 and an interface 1022. The interface 1022 is coupled with an antenna array 1023 including a plurality of antennas 1024. In some examples, the antenna array 1023 may include at least 2 antennas, optionally e.g. 4 antennas, further optionally e.g. 16 antennas, further optionally at least 32 antennas. Generally, the antenna array 1023 of the UE 102 may include fewer antennas 1024 then the antenna array 1013 of the BS 101. In some examples, it is even possible that the UE 102 does not include an antenna array 1023, but rather includes a single antenna. Each antenna 1024 may include one or more electrical traces to carry a radio frequency current. Each antenna 1024 may include one or more LC-oscillators implemented by the electrical traces. Each trace may radiate electromagnetic waves with a certain beam pattern. As such, the antennas 1024 may form an antenna port for providing an output signal to the radiating LC-oscillators.

The UE 102 further includes a memory 1025, e.g., a non-volatile memory. The memory 1025 may store program code that can be executed by the processor 1021. Executing the program code may cause the processor 1021 to perform techniques with respect to random-excess procedures as described herein.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beam configurations of the antenna arrays 1013, 1023. For example, to implement a certain propagation channel 151 for DL communication, a certain DL transmit beam configuration may be selected for the antenna array 1013 of the BS 101. Here, the beam configurations may generally be implemented by certain antenna weights of the antennas 1014, 1024 of the respective antenna array 1013, 1023. Sometimes, the antenna weights are also referred to as steering vectors. Accordingly, different beam configurations may be obtained by using different amplitude and phase configurations for the various antennas 1014, 1024 of the respective antenna arrays 1013, 1023. Generally, beam configurations may be applied for transmission (transmit beam configurations) and/or reception (receive beam configurations). Furthermore, generally, beam configurations may be applied for DL communication (DL beam configurations) and/or UL communication (UL beam configurations). Thus, the different propagation channels 151 can be generally implemented using beams of different spatial directivity at the BS 101 and/or the UE 102.

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. By using appropriate propagation channels 151, diversity can be provided to reduce fading. According to various examples described herein, selection of the appropriate propagation channels 151 is facilitated.

Generally, such multi-beam operation is expected to be used in NR networks operated at carrier frequencies above 6 GHz. Here, the beam from both BS 101 and UE 102 should be aligned to avoid signal loss. In multi-beam operation, beam sweeping operation can be required, particularly in scenarios where there is no or limited transmit/receive reciprocity at the BS 101 and/or at the UE 102.

Figure 3:
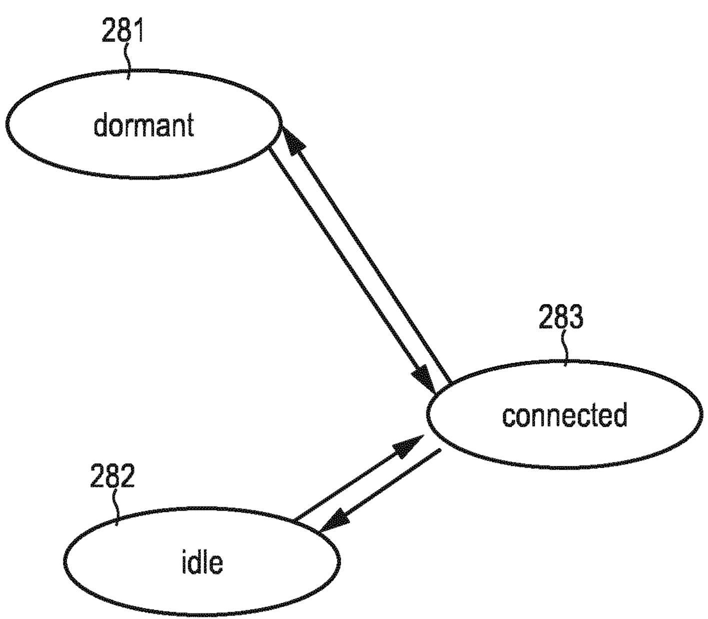
FIG. 3 schematically illustrates multiple states of the UE according to various examples, wherein transitions from a dormant state and an idle state to a connected state, respectively, are associated with a RACH procedure.

FIG. 3 schematically illustrates aspects with respect to the connection between the UE 102 and the network 100. In the example of FIG. 3, the connection between the UE 102 and the network 100 is defined with respect to certain connection states 281-283.

In a dormant state 281, the UE 102 is fully disconnected from the network 100. As such, the network 100 may not be aware of the location of the UE 102. Transmission of UL data and/or of DL data may not be possible. A higher-layer data connection may not be established.

Upon initialization of the connection with the network 100, the UE 102 transitions into a connected state 283. In the connected state 283, it is possible that one or more higher-layer data connections such as bearers for communication of the data have been established. For example, an end-to-end data connection within the data plane of the network 100—encompassing one or more gateway nodes of the core of the network 100—may have been established. In the connected state 283, an Internet protocol (IP) address may have been assigned to the UE 102. In the connected state 283, it may be possible to transmit UL data and/or DL data. The network 100 may be aware of the location of the UE 102.

In an idle state 282, communication of data between the UE 102 and the network 100 may be restricted. For example, in the idle state 282, the network 100 may hold no valid location or routing information for the UE 102. The particular serving BS within which the UE 102 is located may not been known to the network 100. Nonetheless, in the idle state 282, some context information of the UE 102 may be accessible to the network 100. For example, the position of the UE 102 may be known at tracking area granularity. Then, paging of the UE 102 within a tracking area may be possible.

This may facilitate connection of the UE 102 to the network 100, e.g., by setting up an appropriate bearer and/or assigning an IP address to the UE 102. This may correspond to transition into the connected state 283.

Upon transition from the dormant state 281 to the connected state 283 and/or upon transition from the idle state 282 to the connected state 283, execution of a RACH procedure may be required. This may be because no resources for communicating data on the wireless link 111 may be allocated to the UE 102 operating in the dormant state 281 or the idle state 282. Thus, generally, the RACH procedure be triggered by UL data scheduled for transmission and/or by DL data scheduled for transmission. For example, the RACH procedure may be triggered by a DL paging of the UE 102 within a tracking area or, generally, DL paging by one or more BSs 100 of the network 100.

Figure 4:
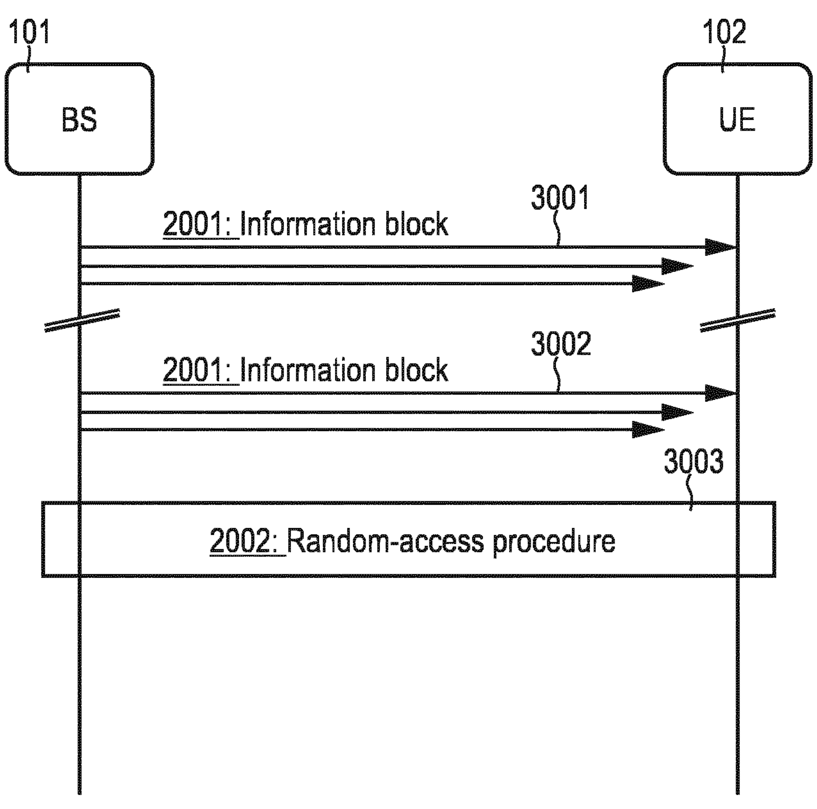
FIG. 4 schematically illustrates a RACH procedure according to various examples.

FIG. 4 is a signaling diagram illustrating aspects with respect to a RACH procedure 2002.

First, at multiple occasions 3001 and 3002, the BS 101 broadcasts information blocks 2001, e.g., a system information block. For example, the BS 101 continuously broadcasts the information blocks 2001. Examples of information blocks 2001 include the 3GPP LTE Master Information Block (MIB) and the 3GPP System Information Block (SIB) or any similar information block for NR. The information blocks 2001 may be receivable by UEs not connected to the network 100. This may correspond to certain modulation and coding parameters used for the transmission blocks 2001. These modulation and coding parameters may be pre-configured and thus may be known to the UE 102, as well as one or more further UEs.

The information blocks 2001 may include certain information that facilitates the RACH procedure 2002 at block 3003. For example, the information block 2001 may be indicative of an identity of the BS 101; thereby, any UL information transmitted by the UE 102 as part of the RACH procedure 2002 may be labeled as being directed to the BS 101.

Furthermore, based on the identity of the BS 101 or another appropriate parameter, selection of the preamble used by the UE 102 during the RACH procedure 2002 may be facilitated.

The information block 2001 may further be indicative of resources allocated for the RACH procedure 2002 by the UE 102. The resources may be specified with respect to a time-frequency grid. The resources may be referred to as radio resources. Alternatively or additionally, the resources may be specified in code domain. The resources may be defined on a PRACH channel or RACH channel. The PRACH channel or RACH may be distinct from one or more control channels and physical channels used during the connected state 283.

The particular type of the RACH procedure 2002 may vary for different implementations. For example, a 2-step RACH procedure or a 4-step RACH procedure may be employed. According to various examples, it is also possible to employ decision logic for selecting between different types of RACH procedures 2002. This is illustrated with respect to FIG. 5.

Figure 5:
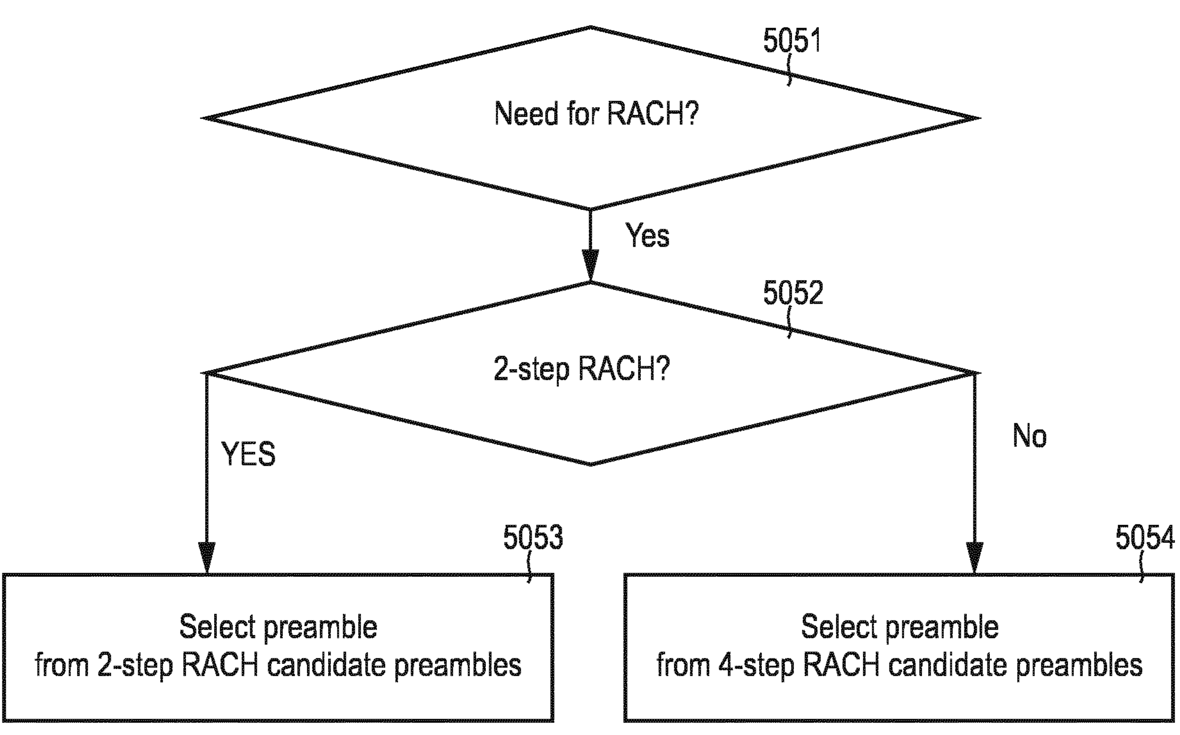
FIG. 5 is a flowchart of a method according to various examples, wherein the method includes selecting between a 2-step RACH procedure and a 4-step RACH procedure.

FIG. 5 is a flowchart of a method according to various examples. FIG. 5 illustrates aspects with respect to selection between a plurality of RACH procedures 2002. For example, the method according to FIG. 5 could be executed by the processor 1021 of the UE 102. It would also be possible that the decision logic for selection between a plurality of RACH procedures 2002 at least partly resides at the network 100, e.g., at the BS 101.

First, in block 5051, it is determined whether there is a need for a RACH procedure. This may involve—as explained with respect to FIG. 3—checking whether a transition to the connected state 283 is required. Other trigger criteria are conceivable.

If, in block 5051, it is determined that there is a need for a RACH procedure, next, a selection between a 2-step RACH procedure and a 4-step RACH procedure occurs in block 5052. Generally, a selection between a more than two types of RACH procedures and/or different types of RACH procedures may occur in block 5052.

In some examples, depending on the selected RACH procedure, the associated preamble may be selected from different sets of candidate preambles, e.g., using an at least partly randomize scheme. Hence, generally, different preambles may be used for different types of RACH procedures; this may correspond to employing different signatures for different types of RACH procedures. Thereby, the used preamble may be indicative of the type of the RACH procedure employed. This may help to inform at the network of the particular type of RACH procedure employed by the UE 102. Each candidate preamble may have a unique signature such that collision between multiple UEs can be mitigated.

For example, if the 2-step RACH procedure is selected in block 5052, the preamble used during the 2-step RACH procedure is selected in block 5053 from a corresponding set of candidate preambles {P[2-step]}. Differently, if the 4-step RACH procedure is selected in block 5052, the preamble used during the 4-step RACH procedure is selected in block 5054 from a corresponding set of candidate preambles {P[4-step]}. {P[2-step]} and {P[4-step]} may be overlapping—i.e., some preambles may be available to, both the 2-step RACH procedure, as well as the 4-step RACH procedure—, non-overlapping—i.e., all preambles are either dedicated to 2-step PRACH or to 4-step RACH procedure—, or even identical—i.e., all preambles are available to, both, the 2-step RACH procedure, as well as the 4-step RACH procedure. If they are non-overlapping, this can be helpful for informing the BS 101 of the employed type of the RACH procedure even though allocating the same resources for different types of RACH procedures. For overlapping or identical sets of candidate preambles, it would be possible that different resources are allocated for different types of RACH procedures. Then, by the use of different resources, the BS 101 is made aware of the type of the employed RACH procedure, i.e., 2-step RACH procedure vs. 4-step RACH procedure.

For example, the selection in block 5052 may be based on elements selected from the group comprising: idle state of operation of the UE 102; availability of a-priori identification of the UE 102; mobility level of the UE 102; queued UL data; and a latency requirement of the queued UL data.

For example, if the UE 102 operates in idle state 282, it may be beneficial to employ a shortened RACH procedure. For example, if the UE 102 operates in the idle state 282, an identity may have been previously assigned to the UE 102, e.g., Cell Radio Network Temporary Identity (C-RNTI) in the 3GPP LTE framework or a Resume ID. It may then be possible to perform the shortened RACH procedure using this a-priori identification of the UE 102.

Likewise, if a mobility level of the UE 102 is comparably high, selection of a longer RACH procedure may be favorable in order to avoid ambiguities. The mobility level may be indicative of a change of position of the UE 102 per time. The mobility level may be determined by UE speed estimation by processing the received BS 101 reference symbols, acceleration sensors and/or satellite positions sensors of the UE 102. For example, if the UE 102 has significantly moved due to the increased mobility level between 2 subsequent RACH procedures, the validity of an a-priori identification of the UE 102 may be questionable.

For example, the selection block 5052 may take into account the trigger criterion for performing the RACH procedure in block 5051. If the trigger criterion relates to queued UL data, then a shortened RACH procedure 2002 may be selected in block 5052. This may be done in order to facilitate low-latency communication of the UL data. In certain implementations it would also be possible to check whether the latency requirement of the queued UL data warrants a shortened RACH procedure, e.g., because the latency requirements is strict, e.g., on the order of a few milliseconds. The latency requirement may specify a maximum delay tolerable for successfully delivering the data. The latency requirement may be specified in the context of a quality of service agreement associated with the data.

The selection of preambles in blocks 5053, 5054 may depend on information included in broadcasted information blocks of the BS 101. For example, a cell identity of the BS 101 may be taken into account.

The techniques regarding selection between different types of RACH procedures according to FIG. 5 may be employed in isolation or in combination with the various further techniques described herein.

Figure 6:
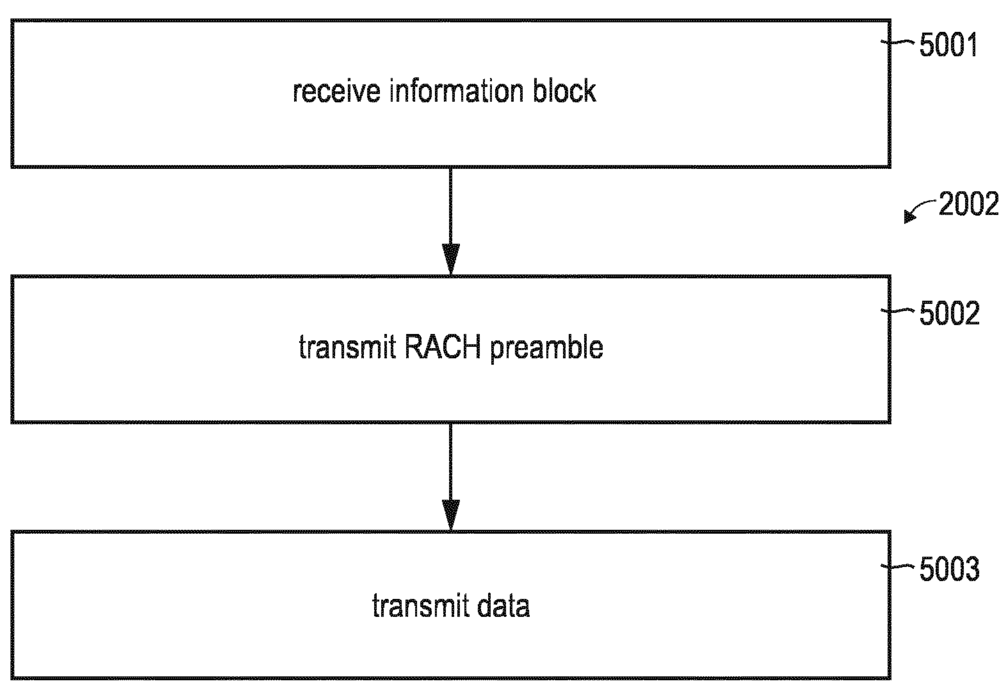
FIG. 6 is a flowchart of a method according to various examples, wherein the method includes transmitting a preamble and data.

FIG. 6 is a flowchart of a method according to various examples. For example, the method according to FIG. 6 could be executed by the processor 1021 of the UE 102. FIG. 6 illustrates aspects with respect to performing a RACH procedure 2002. For example, the method of FIG. 6 could be performed subsequent to execution of step 5052 of FIG. 5.

First, in block 5001, a broadcasted information block 2001 is received. The information block 2001 may include information that facilitates execution of the RACH procedure 2002. For example, the preamble may selected from a plurality of candidate preambles; said selection may be based on the information block 2001 received in block 5001.

Next, in block 5002, the preamble may be transmitted on resources indicated by the information block received as part of block 5001.

In block 5003, data is transmitted. In particular, UL data may be transmitted. For example, payload data and/or control data may be transmitted in block 5003.

For transmission of the data in block 5003, resources may be employed which are indicated by the information block 2001 received as part of block 5001. As such, it is possible that transmission of the preamble in block 5002 and transmission of the data in block 5003 is, both, performed in response to receiving the information block 2001 in block 5001.

Figure 7:
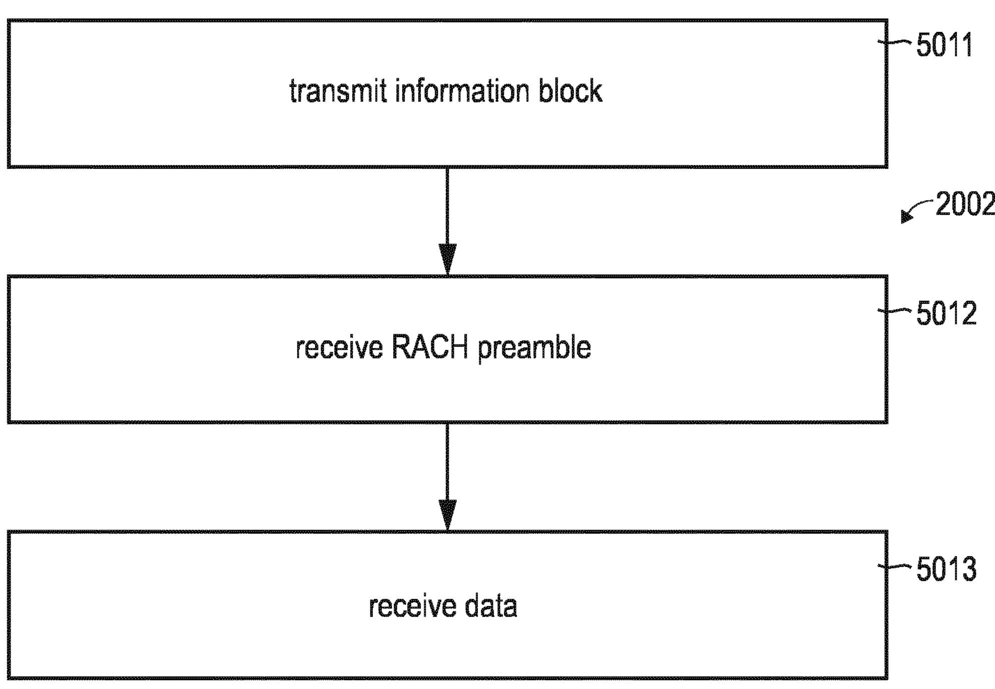
FIG. 7 is a flowchart of a method according to various examples, wherein the method includes receiving a preamble and data.

FIG. 7 is a flowchart of a method according to various examples. For example, the method according to FIG. 7 could be executed by the processor 1011 of the BS 101. The method according to the example of FIG. 7 is generally inter-related to the method according to the example of FIG. 6.

Block 5011 corresponds to block 5001. In detail, in block 5011, the information block 2001 is transmitted.

Block 5012 corresponds to block 5002. In detail, in block 5012, the preamble is received.

Block 5013 corresponds to block 5003. In detail, in block 5013, the data is received.

Figure 8:
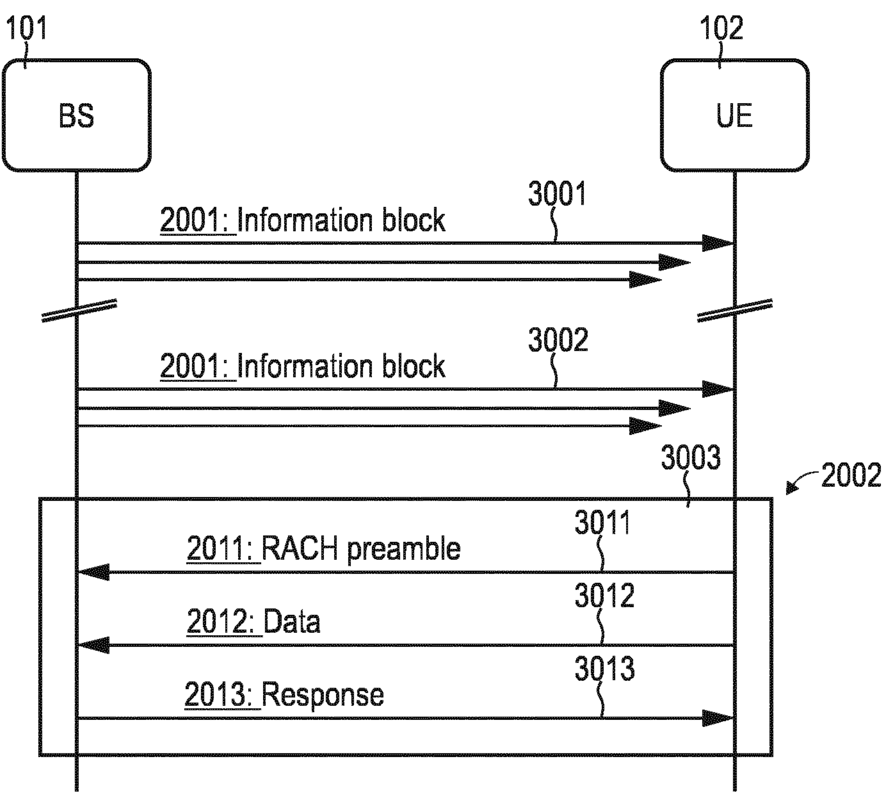
FIG. 8 schematically illustrates a RACH procedure according to various examples.

FIG. 8 is a signaling diagram illustrating aspects with respect to a RACH procedure 2002. The example of FIG. 8 generally corresponds to the example of FIG. 4. FIG. 8 illustrates a specific example of the RACH procedure 2002. In detail, FIG. 8 illustrates a 2-step RACH procedure 2002. While with respect to the example of FIG. 8 a 2-step RACH procedure 2002 is illustrated, generally, the various techniques described herein may also be applied for different types of RACH procedures.

As part of the RACH procedure 2002, first, a preamble 2011 is transmitted from the UE 102 to the BS 101 at 3011. Then, data 2012 is transmitted from the UE 102 to the BS 101 at 3012. For example, 3011 and 3012 could be implemented as a single message.

In some examples, the information block 2001 may be indicative of a size threshold of the data 2012. For example, the information block 2001 may include a respective indicator which explicitly or implicitly indicates the size threshold. Then, the UE 102 may perform a threshold comparison between the size threshold and the size of the data 2012 to determine whether the entire data or even a fraction of the data 2012 should be transmitted as part of the RACH procedure 3003.

Next, at 3013, a response message 2013 is transmitted from the BS 101 to the UE 102. The response message 2013 may conclude the RACH procedure 2002. For example, the response message 2013 may set up a higher-layer data connection between the UE 102 and the BS 101 for transmitting data.

Figure 9:
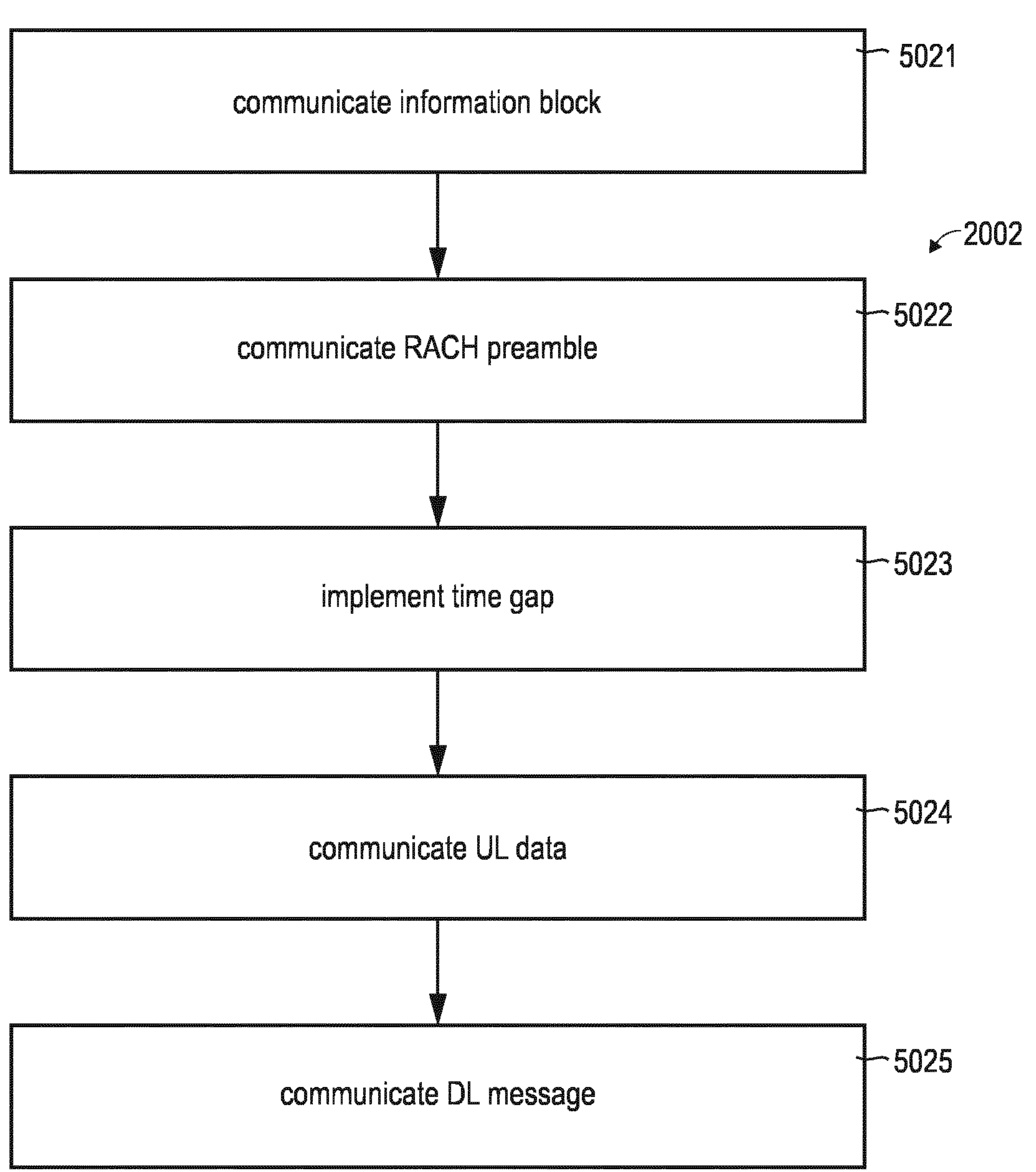
FIG. 9 is a flowchart of a method according to various examples.

FIG. 9 is a flowchart of a method according to various examples. For example, the method according to FIG. 9 may be executed by the processor 1021 of the UE 102 and/or by the processor 1011 of the BS 101.

First, an information block 2001 is transmitted and/or received (communicated) at block 5021. The information block 2001 may be indicative of first resources and second resources. The first resources and the second resources may be offset in time domain by a time gap. This may, in particular, apply to scenarios employing multi-beam transmission. In the case where the multi-beam transmission is not deployed—e.g. NR with low carrier frequency—, the time gap can be set to zero, i.e., there may be no time gap implemented In some examples, the information block 2001 may explicitly indicate the second resources. For example, the information block 2001 may indicate a size of the second resources—e.g., in terms of frequency bandwidth and/or time duration. This may help to configure the second resources according to different needs. For example, the information block 2001 may indicate different second resources for different types of data 2012. This may help to accommodate larger or smaller data 2012 appropriately. In other examples, it would also be possible that the information block 2001 implicitly indicates the second resources, e.g., by indicating that a predefined allocation scheme is supported, etc.

For example, the second resources may be delayed if compared to the first resources by the duration of the time gap. The time gap may be occupied by other channels of the wireless link 111, e.g., a control channel or shared channel for payload data. For example, the time gap may have a duration in the range of 0.1 milliseconds-5 milliseconds, optionally in the range of 0.5 milliseconds-2 milliseconds. Generally, the time gap may have a duration which is shorter or longer than a duration of a subframe of the transmission protocol implemented by the BS 101 and the UE 102. For example, if a comparably long time gap is implemented that is longer than a subframe, this may facilitate allocation of larger second resources to accommodate larger amounts of data across boundaries of multiple subframes and/or subframe.

Next, at block 5022, the preamble 2011 is communicated. In block 5022, the first resources indicated by the information block 2001 are employed. For example, multiple repetitions of the preamble 2011 may be communicated, e.g., using a fixed UL transmit beam configuration. This can facilitate a beam sweeping operation of the BS 101 where different UL receive beam configurations are subsequently activated.

At block 5023, the time gap is implemented. This may facilitate determination of a UL receive beam configuration by the BS 101. An appropriate dimensioning of the time gap allows to account for processing delay, e.g., at the BS 101.

At block 5024—after the time gap—, UL data is communicated. Here, the UL receive beam configuration may be employed which has previously been determined during the time gap of block 5023. In block 5024, the second resources indicated by the DL information block are employed.

In some examples, the UL data of block 5024 may be indicative of a suggested DL transmit beam configuration; it is then possible that the suggested DL transmit beam configuration is taken in to consideration when determining a DL transmit beam configuration used for transmitting a DL message 2013 in block 5025.

At block 5025, the DL message 2013 of the RACH procedure 2002 is communicated. The DL message 2013 may conclude the RACH procedure 2002. The DL message 2013 at block 5025 may be transmitted employing the suggested DL transmit beam configuration or another DL transmit beam configuration determined based on the suggested DL transmit beam configuration.

Figure 10:
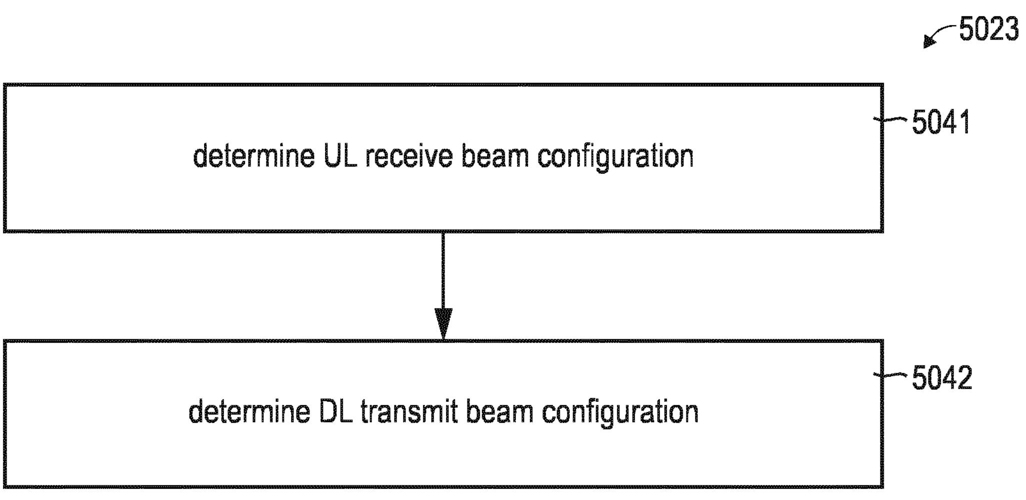
FIG. 10 is a flowchart of a method according to various examples, wherein the method includes determining of an UL receive beam configuration and a DL transmit beam configuration.

FIG. 10 is a flowchart of a method according to various examples. For example, the method according to FIG. 10 may be executed by the processor 1011 of the BS 101. It would be possible that the method according to FIG. 10 is fully or partly executed during the time gap of block 5023 (cf. FIG. 9).

In block 5041, an UL receive beam configuration is determined. For example, the UL receive beam configuration in block 5041 may be determined based on reception of the preamble in the first resources. Here, receive properties of the preamble may be taken into account. Sometimes, a set of linear equations may be solved as part of block 5041. This may occupy computational resources. To accommodate the respective determination within the time gap, the duration may be chosen appropriately. For example, the BS 101 could be performing a receive beam sweep to identify the best beam configuration for reception from the UE 102. If the preamble is transmitted repeatedly by the UE 102, the BS 101 can identify the best beam configuration which leads to a high signal-to-noise ratio for reception.

If block 5041 is executed during the time gap of block 5023, this can facilitate reception of the data 2012 communicated in block 5024 at a high signal-to-noise ratio using the appropriate UL receive beam configuration. This, in turn, increases a likelihood of successful receipt of the UL data communicated in block 5024.

Next, in block 5042, a DL transmit beam configuration is determined. The DL transmit beam configuration may be employed for communicating the DL message 2013 in block 5025 (cf. FIG. 9). In some examples, it may be possible to determine the DL transmit beam configuration of block 5042 based on the UL receive beam configuration determined at block 5041. For example, this may be done under the assumption of reciprocity of the various propagation channels 151.

Figure 11:
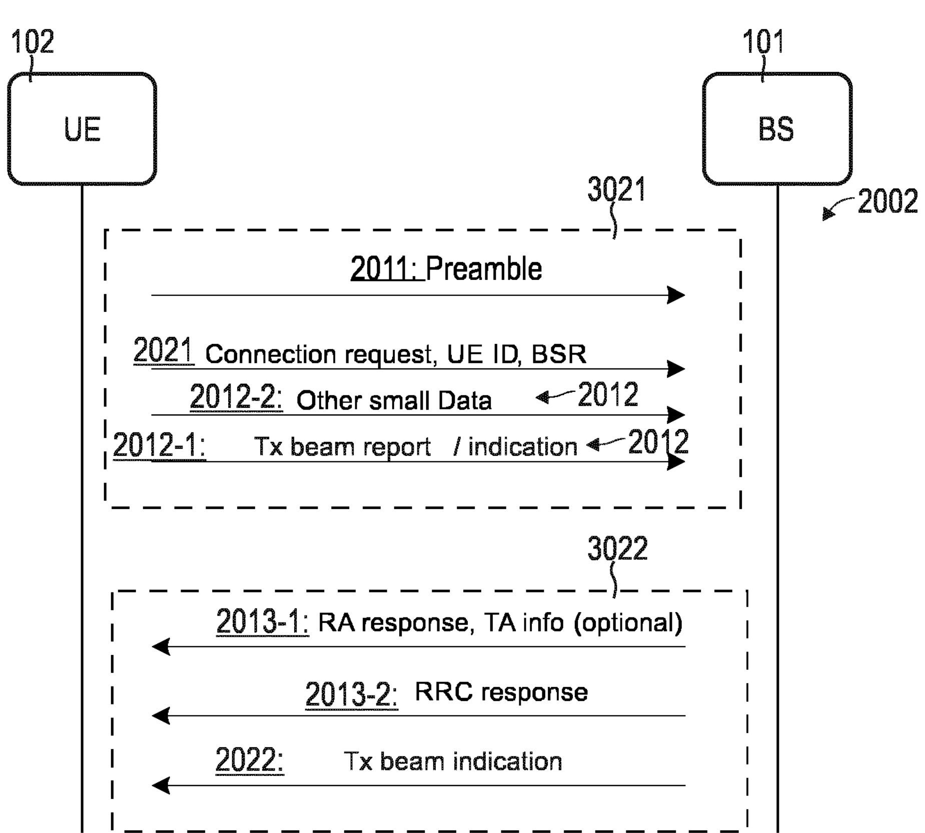
FIG. 11 schematically illustrates a 2-step RACH procedure according to various examples.

FIG. 11 is a signaling diagram according to various examples. FIG. 11 illustrates aspects with respect to the RACH procedure 2002. In particular, FIG. 11 illustrates aspects with respect to a 2-step RACH procedure 2002.

The 2-step RACH procedure 2002 includes a first message 3021 and a second message 3022. The message 3021 is transmitted using resources indicated by the information block 2001 broadcasted by the BS 101. The message 3021 includes the preamble 2011 and data 2012, in particular, data 2012-1 indicative of a suggested DL transmit beam configuration and optionally further small data 2012-2. For example, a compressed indicator may be used to indicate the suggested DL transmit beam configuration. For example, the compressed indicator may be a Boolean flag which indicates if a DL transmit beam configuration previously employed by the BS 101 is still deemed valid by the UE 102. The previously employed beam configuration by the BS can be the beam configuration used in periodic broadcast signals, such as synchronization signals (SS) and/or broadcast channel (BCH). The message 3021 also includes a connection request 2021, an identity of the UE 102—which may have been previously assigned by the network and, thus, a-priori defined—, as well as a BSR. The BSR may be indicative of an amount of UL data scheduled for transmission to the network and/or a latency of the UL data scheduled for transmission to the network 100. Based on the BSR, the BS 101 may allocate UL resources to the UE 102 on a subsequently established higher-layer data connection (not shown in FIG. 11).

The DL message 3022 includes the RACH response 2013-1 and optionally a timing advance. For example, the timing advance may not be required in small cells. The message 3022 also includes a Layer 3 RRC response 2013-2; thereby, the higher-layer data connection may be set up.

The message 3022 may be indicative of the DL transmit beam configuration employed by the BS 101 for transmission of the DL message 3022. For example, the message 3022 may include an indicator 2022 indicative of the DL transmit beam configuration employed by the BS 101 for transmission of the DL message 3022. This helps the UE 102 to make a suggestion of an UL receive beam configuration to the BS 101, e.g., in a next RACH procedure (not shown in FIG. 11). The next RACH procedure may occur after the UE 102 has switched back to idle state 282. This may occur after the UL data has been transmitted. The received indicator 2022 can be expired if the next transmission is too long. For example, a corresponding expiry timer may be set in the order of the duration of at least several subframes.

In some scenarios, it may be possible to omit the indicator 2022 from the message 3022. In other words, it may be possible to selectively include the indicator 2022 in the message 3022. Still, the message 3022 may be implicitly indicative of the DL transmit beam configuration. For example, if the indicator 2022 is not included in the message 3022, this may indicate that the message 3022 has been transmitted using the DL transmit beam configuration which equals or corresponds to the suggested DL transmit beam configuration indicated by the data 2012-1 in the message 3021. This reduces signaling overhead.

Optionally, the indicator 2022 may also facilitate determination of an appropriate UL transmit beam configuration and/or DL receive beam configuration. In detail, it may be possible that the UE 102 determines a DL receive beam configuration based on the indicator 2022. Optionally, it would also be possible that the UE 102 determines an UL transmit beam configuration based on the indicator 2022; this UL transmit beam configuration may be used in one or more further UL messages (not shown in FIG. 11) transmitted later on, e.g., including data associated with the higher-layer data connection. For example, the one or more further UL messages may include excess UL data schedule for transmission that could not be accommodated in the resources of the message 3021.

Figure 12:
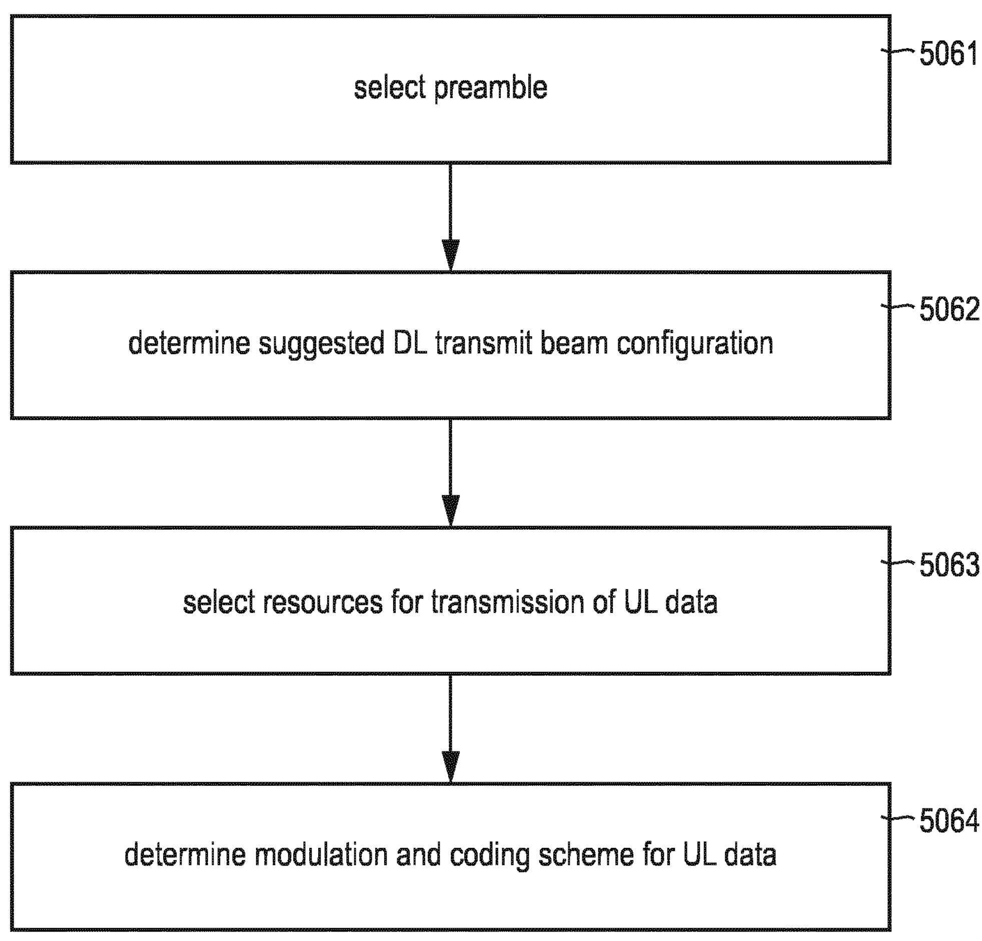
FIG. 12 is a flowchart of a method according to various examples.

FIG. 12 is a flowchart of a method according to various examples. For example, the method according to FIG. 12 may be executed by the processor 1021 of the UE 102.

First, in block 5061, a preamble 2011 of a RACH procedure is selected. Block 5061 corresponds to blocks 5053, 5054. For example, the preamble 2011 may be selected from a plurality of candidate preambles, e.g., using an at least partly randomize scheme to mitigate interference between multiple UEs attempting to access the wireless link 111 contemporaneously. In some examples, it is possible that the preamble in block 5061 is selected from a plurality of candidate preambles depending on the selected type of RACH procedure. For example, depending on whether a 2-step or 4-step RACH procedure is employed (cf. FIG. 5: block 5052), the preamble may be selected from a different set of candidate preambles. Additionally or alternatively, a cell ID of the BS 101 may be taken into account.

Next, in block 5062, the suggested DL transmit beam configuration is determined. Based on the determination of block 5062, the data 2012-1 can be included in the message 3021 of the RACH procedure 2002.

Different considerations can be taken into account in block 5062. For example, the suggested DL transmit beam configuration can be determined based on knowledge of a previous DL transmit beam configuration employed by the BS for communication with the UE 102. For example, such a previous DL transmit beam configuration could be indicated by the indicator 2022 of the message 3022 of a previous RACH procedure 2002. Alternatively or additionally, such a previous DL transmit beam configuration could be indicated by a corresponding indicator transmitted by the BS 101 after connection setup has completed, i.e., after completion of the previous RACH procedure 2002.

A further consideration that may be taken into account in block 5062—alternatively or additionally to the a-priori knowledge of the DL transmit beam configuration—is the mobility of the UE 102. For example, the a previously indicated DL transmit beam configuration may become invalid if the UE 102 has significantly moved since the point in time at which the previous DL transmit beam configuration has been employed. Thus, generally, it may be possible to monitor mobility of the UE 102 and to determine the suggested DL transmit beam configuration depending on said monitoring of the mobility of the UE 102. This may or may not be combined with monitoring expiry of a timer which can be generally indicative of a temporal validity of the previous DL transmit beam configuration.

In block 5063 the resources for transmission of the data 2012, 2012-1, 2012-2 are selected. This may be done based on different techniques. In some examples it is possible that the resources for transmission of the UL data implicitly or explicitly indicated by the information block 2001. For example, it would be possible that the resources for transmission of the UL data are implicitly indicated by the information block 2001 with respect to resources for transmission of the preamble 2011. In other scenarios it would be possible that different resources are selected for transmission of the data 2012, 2012-1, 2012-2—alternatively or additionally to taking into account information included in the information block 2001—depending on the selected preamble 2011 according to block 5061. Thereby, interference between communication of UL data by multiple UEs attempting to access the wireless link 111 contemporaneously can be mitigated, because the preamble may be selected at least partly on a randomize scheme. For example, it would be possible to select at least one of a FDD, TDD, SDD, and CDD parameter of the resources for transmission of the UL data depending on the preamble selected in block 5061.

In block 5063, it would also be possible to determine the size of the resources for transmission of the data 2012, 2012-1, 2012-2. Here, a type of the data 2012, 2012-1, 2012-2 may be taken into account, e.g., if the information block 2001 gives the UE 102 the freedom to select between different resources having different sizes.

Such techniques of determining the resources for transmission of the UL data also relate to determining a duration of any potential time gap between the resources for transmission of the preamble and the resources for transmission of the UL data. For example, it would be possible to determine—as part of block 5063—the duration of the time gap. For example, the duration of the time gap may be determined depending on the information block 2001. Because the time gap may be used by the BS 101 to determine a favorable UL receive beam configuration, the duration of the time gap may be influenced by the processing power of the processor 1011 of the BS 101. By dynamically setting the duration of the time gap via the information block 2001, tailored dimensioning of the duration of the time gap in view of the processing power of the processor 1011 of the BS 101 becomes possible.

Next, in block 5064, a modulation and coding scheme of the data 2012, 2012-1, 2012-2 is determined. In some examples, the modulation and coding scheme may be determined dynamically. For example, the modulation and coding scheme may be determined based on the broadcasted information block 2001 received by the UE 102. Here, a respective indicator may be included by the BS 101 which instructs the UE 102 of the modulation and coding scheme to be used. A low modulation and coding scheme may be preferable in some examples. By such an approach, the transmission of the data 2012, 2012-1, 2012-2 can be protected against transmission failure. This may take into account a current channel condition sensed by the BS 101. E.g., the processor 1011 may be configured to determine the modulation and coding scheme based on a sensed condition of the wireless link 111. In other examples, the modulation and coding scheme can be preconfigured at the BS. A lower-order modulation and a strong coding rate may be used.

Figure 13:
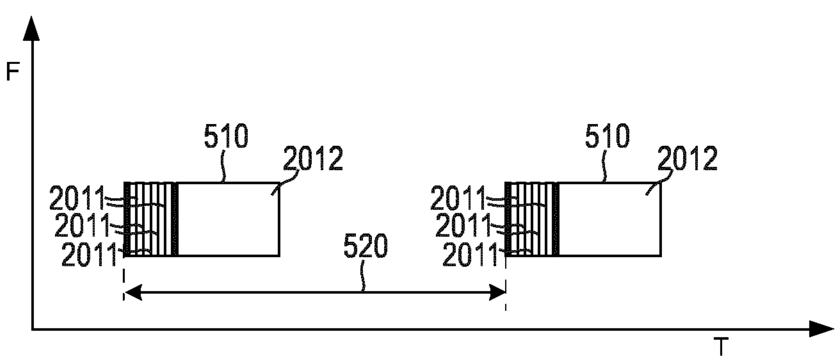
FIG. 13 schematically illustrates resources for a RACH procedure according to various examples.

FIG. 13 illustrates aspects with respect to resources allocated for a RACH procedure 2002. FIG. 13 illustrates the resources in time-frequency domain.

In the example of FIG. 13, resources 510 are illustrated which are used for communication of the message 3021. Here, a first section of the resources 510 is used for repetitive transmission of the preamble 2011. Here, multiple repetitions of the preamble 2011 may employ the same transmit beam configuration. Transmission of the preamble 2011 is framed by a cyclic prefix and a guard time (full black areas in FIG. 13). A second section of the resources 510 is used for the transmission of the data 2012, 2012-1, 2012-2. From FIG. 13 it is apparent that the resources 510 are contiguous and not separated by a time gap.

Generally, the resources 510 may be dedicatedly allocated to a certain type of RACH procedure 2002, e.g., to either the 2-step RACH procedure or the 4-step RACH procedure. In other examples, the preamble 2011 may be indicative of the type of the RACH procedure; then, the same resources 510 may be allocated to different types of RACH procedures.

Figure 14:
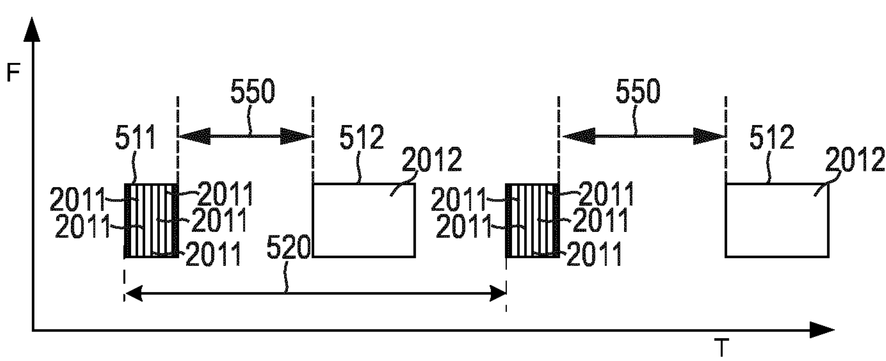
FIG. 14 schematically illustrates resources for a RACH procedure according to various examples.

FIG. 14 illustrates aspects with respect to resources used for a RACH procedure. FIG. 14 illustrates the resources in the time-frequency domain. The example of FIG. 14 generally corresponds to the example of FIG. 13. However, in the example of FIG. 14, the information block is indicative of first and second resources 511, 512 separated by a time gap 550. The resources 511 are used for communication of the preamble 2011; while the resources 512 are used for transmission of the data 2012, 2012-1, 2012-2. The duration of the time gap 550 is generally longer than the duration of the guard time, e.g., by not less than a factor of three.

The intention of guard time may be to prevent interference between the preamble and the subsequent data transmission, e.g., in a scenario in which the timing advance (TA) has not been applied by the UE. For example, if the UE 102 is located far away from the eNB 101, the propagation duration of signals between the UE 102 and the eNB 101 may be on the same order of magnitude as the duration of the guard time: The preamble from the UE may be received in that guard time period. Thus, the guard time serves a different purpose if compared to the time gap. For small cells, may not be necessary and thus the guard time may not be required; nonetheless the time gap may be implemented.

In the example of FIG. 14, the duration of the time gap 550 changes after the periodicity 520. That may be achieved by transmitting the information block 2001 which is indicative of the currently valid duration of the time gap 550. In other examples, it would also be possible that the duration of the time gap 550 is statically configured and does not change from RACH opportunity to RACH opportunity.

Figure 15:
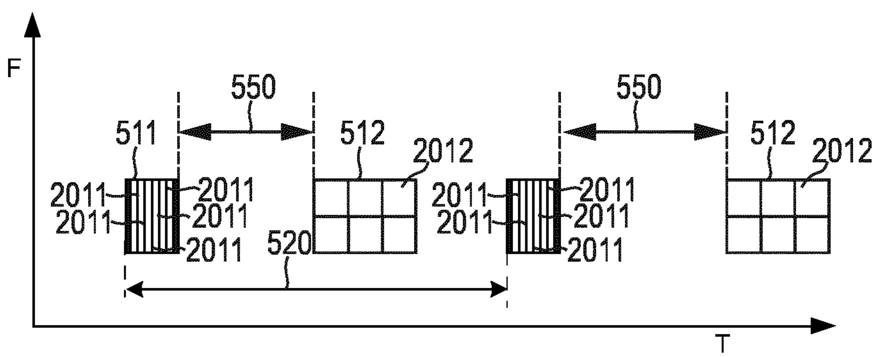
FIG. 15 schematically illustrates resources for a RACH procedure according to various examples.

FIG. 15 illustrates aspects with respect to resources used for a RACH procedure. FIG. 15 illustrates the resources in the time-frequency domain. The example of FIG. 15 generally corresponds to the example of FIG. 14. However, in the example of FIG. 15, the resources 512 for the transmission of the data are sub-structured according to TDD and FDD. For example, different TDD and FDD parameters of the resources 512 may be selected depending on the used preamble 2011 and/or according to predefined rules. Thereby, interference between multiple UEs attempting to connect to the network in the same RACH opportunity may be mitigated.

Generally, the resources 510, 512 available for transmission of the data 2012 may be configurable. This may be achieved by setting a respective parameter in the information block 2001. For example, the resources 510, 512 available for transmission of the data 2012 may depend on the application or traffic type associated with the data 2012.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device comprising control circuitry configured to:

receive at least one of a master information block or a system information block from a network node of a network, the at least one of the master information block or the system information block indicating resources for a random-access procedure including one or more first resources for a random-access preamble and one or more second resources for data, the at least one of the master information block or the system information block further indicating a time gap between the one or more first resources and the one or more second resources, after receiving the at least one of the master information block or the system information block:

select a preamble from a plurality of candidate preambles depending on the at least one of the master information block or the system information block, select the one or more second resources depending on the selected preamble and the time gap, transmit the preamble for the random-access procedure to the network node using the one or more first resources, determine a modulation and/or a coding scheme of data depending on the at least one of the master information block or the system information block, and transmit data to the network node using the one or more second resources and the modulation and/or coding scheme determined.

2. The device of claim 1, wherein the control circuitry is further configured to:

select at least one of a frequency-division duplex parameter, a time-division duplex parameter, a code-division duplex parameter, and a space-division duplex of the one or more second resources depending on the selected preamble.

3. The device of claim 1, wherein the time gap has a duration in the range of 0.1 ms-2 ms.

4. The device of claim 1, wherein the control circuitry is further configured to:

determine a duration of a time gap between a transmission of the preamble and a transmission of the data depending on the at least one of the master information block or the system information block.

5. The device of claim 1, wherein the data is indicative of a suggested downlink transmit beam configuration of a downlink message of the random-access procedure.

6. A device comprising control circuitry configured to:

receive at least one of a master information block or a system information block from a network node of a network, the at least one of the master information block or the system information block indicating resources for a random-access procedure including one or more first resources for a random-access preamble and one or more second resources for data, the at least one of the master information block or the system information block further indicating a time gap between the one or more first resources and the one or more second resources, select a preamble from a plurality of candidate preambles based on the at least one of the master information block or the system information block, select resources from the one or more second resources depending on the selected preamble, transmit the preamble of the random-access procedure to the network node using the one or more first resources, determine a modulation and/or a coding scheme depending on the at least one of the master information block or the system information block, and transmit data indicative of a suggested downlink transmit beam configuration of a downlink message of the random-access procedure to the network node using the selected resources of one or more second resources and the modulation and/or coding scheme determined.

7. The device of claim 6, wherein the control circuitry is further configured to:

monitor mobility of the device, and determine the suggested downlink transmit beam configuration depending on said monitoring of the mobility of the device.

8. The device of claim 6, wherein the control circuitry is further configured to:

determine the suggested downlink transmit beam configuration depending on knowledge of a previous downlink transmit beam configuration employed by the network node for communication with the device.

9. The device of claim 6, wherein the control circuitry is further configured to:

receive the downlink message from the network node in response to transmission of the preamble, the downlink message being indicative of the downlink transmit beam configuration employed by the network node for transmission of the downlink message.

10. The device of claim 9, wherein the control circuitry is further configured to:

determine an uplink transmit beam configuration for an uplink message transmitted to the network node depending on the downlink transmit beam configuration.

11. The device of claim 6, wherein the control circuitry is further configured to:

select between the random-access procedure comprising a first number of messages and a further random-access procedure comprising a second number of messages different from the first number of messages, and select the preamble from a plurality of candidate preambles depending on said selecting between the random-access procedure and the further random-access procedure.

12. The device of claim 11, wherein the control circuitry is further configured to:

select between the random-access procedure and the further random-access procedure depending on at least one element selected from the group comprising: idle state operation of the device; availability of a-priori identification of the device; mobility level of the device; queued uplink data; and a latency requirement of the queued uplink data.

13. A method, comprising:

receiving at least one of a master information block or a system information block from a network node of a network, the at least one of the master information block or the system information block indicating resources for a random-access procedure including one or more first resources for a random-access preamble and one or more second resources for data, the at least one of the master information block or the system information block further indicating a time gap between the one or more first resources and the one or more second resources, after receiving the at least one of the master information block or the system information block:

selecting a preamble from a plurality of candidate preambles depending on the at least one of the master information block or the system information block, selecting the one or more second resources depending on the selected preamble and the time gap, transmitting the preamble of the random-access procedure to the network node using the one or more first resources, determining a modulation and/or a coding scheme depending on the at least one of the master information block or the system information block, and transmitting data to the network node using the one or more second resources and the modulation and/or coding scheme determined.

14. A network node comprising control circuitry configured to:

transmit at least one of a master information block or a system information block, the at least one of the master information block or the system information block indicating resources for a random-access procedure including one or more first resources for a random-access preamble and one or more second resources for data, the at least one of the master information block or the system information block further indicating a time gap between the one or more first resources and the one or more second resources, after transmitting the at least one of the master information block or the system information block:

receive a preamble of the random-access procedure using the one or more first resources, and receive data transmitted using the one or more second resources based on the preamble received and the time gap, and transmitted using a modulation and/or a coding scheme determined based on the at least one of the master information block or the system information block.

15. The network node of claim 14, wherein the control circuitry is further configured to:

determine an uplink receive beam configuration based on reception of the preamble and during the time gap, and receive the data using the one or more second resources employing the determined uplink receive beam configuration.

16. The network node of claim 14, wherein the data is indicative of a suggested downlink transmit beam configuration of a downlink message of the random-access procedure, wherein the control circuitry is further configured to:

determine a downlink transmit beam configuration of the downlink message depending on the suggested downlink transmit beam configuration, and transmit the downlink message using the determined downlink transmit beam configuration.

17. A method, comprising:

transmitting at least one of a master information block or a system information block, the at least one of the master information block or the system information block indicating resources for a random-access procedure including one or more first resources for a random-access preamble and one or more second resources for data, the at least one of the master information block or the system information block further indicating a time gap between the one or more first resources and the one or more second resources;

after transmitting the at least one of the master information block or the system information block:

receiving a preamble of the random-access procedure using the one or more first resources; and receiving data transmitted using the one or more second resources based on the preamble received and the time gap, and transmitted using a modulation and/or a coding scheme determined based on the at least one of the master information block or the system information block.

* * * * *